(12) United States Patent
Fujimura et al.

(10) Patent No.: US 7,248,785 B2
(45) Date of Patent: Jul. 24, 2007

(54) APPARATUS AND METHOD FOR VIDEO/AUDIO RECORDING

(75) Inventors: Kazuya Fujimura, Ikoma (JP); Toshiya Takahashi, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1204 days.

(21) Appl. No.: 09/948,685

(22) Filed: Sep. 10, 2001

(65) Prior Publication Data

US 2002/0031337 A1 Mar. 14, 2002

(30) Foreign Application Priority Data

Sep. 11, 2000 (JP) ............................. 2000-274612

(51) Int. Cl.
*H04N 5/81* (2006.01)
(52) U.S. Cl. ......................................... 386/95; 386/125
(58) Field of Classification Search ................ 386/46, 386/83, 95, 107, 117, 96
See application file for complete search history.

(56) References Cited

U.S. PATENT DOCUMENTS

| | | | | |
|---|---|---|---|---|
| 6,327,417 B1 * | 12/2001 | Hanai et al. | ................... | 386/46 |
| 6,370,316 B1 * | 4/2002 | Yamada et al. | ................ | 386/46 |
| 6,871,107 B1 * | 3/2005 | Townsend et al. | ............ | 700/94 |
| 2002/0033888 A1 | 3/2002 | Yamagami | | |

FOREIGN PATENT DOCUMENTS

| | | | |
|---|---|---|---|
| JP | 5-12341 | | 1/1993 |
| JP | 6-153140 | | 5/1994 |
| JP | 10-42232 | | 2/1998 |
| JP | 11-45510 | | 2/1999 |
| JP | 11-185453 | * | 7/1999 |
| JP | 2000-201310 | | 7/2000 |

* cited by examiner

*Primary Examiner*—Huy T. Nguyen
(74) *Attorney, Agent, or Firm*—Wenderoth, Lind & Ponack, L.L.P.

(57) ABSTRACT

A power control section, which turns a video/audio recording apparatus ON or OFF, outputs power control information. A video recording control section, which starts or stops video recording, outputs video recording control information. A signal input section allows moving picture data to be input. Based on the power control information and the video recording control information, an attribute designation section generates attribute information, which is supplied to a recording section. The attribute information contains a program number used for the classification of moving picture files. Any number of moving picture files which may be recorded after the power is turned ON and before the power is turned OFF are assigned with the same program number. The recording section records on a recording medium the attribute information as well as moving picture files representing the moving picture data which has been input via the signal input section. Thus, a file-by-file recording of moving picture data on a recording medium can be achieved in a manner which facilitates the subsequent finding of a desired file.

2 Claims, 13 Drawing Sheets

F I G. 1
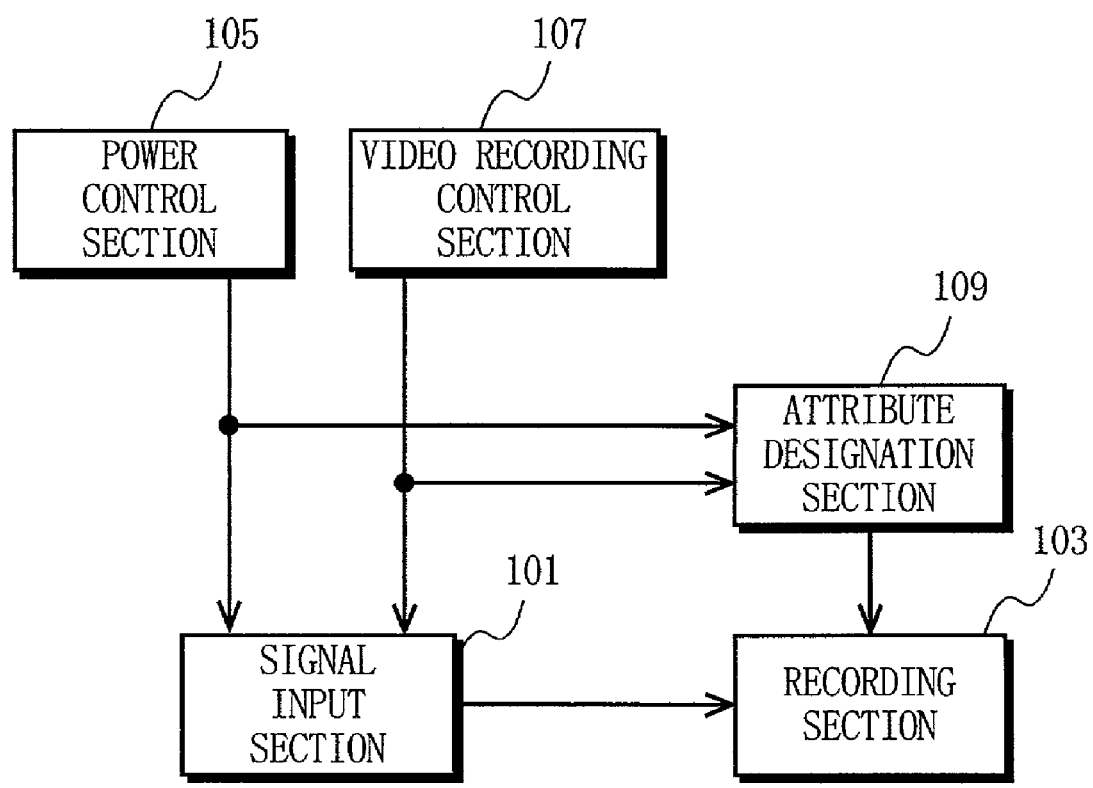

FIG. 5

| PROGRAM NO. | FILE NO. | PATH/FILE NAMES FOR FILE |
|---|---|---|
| 1 | 1 | C:¥PRG001¥MOV001.MOD |
| 1 | 2 | C:¥PRG001¥MOV002.MOD |
| 1 | 3 | C:¥PRG001¥MOV003.MOD |
| ⋮ | ⋮ | |
| 5 | 2 | C:¥PRG005¥MOV002.MOD |
| 5 | 3 | C:¥PRG005¥MOV003.MOD |
| ⋮ | ⋮ | ⋮ |

F I G. 1 3
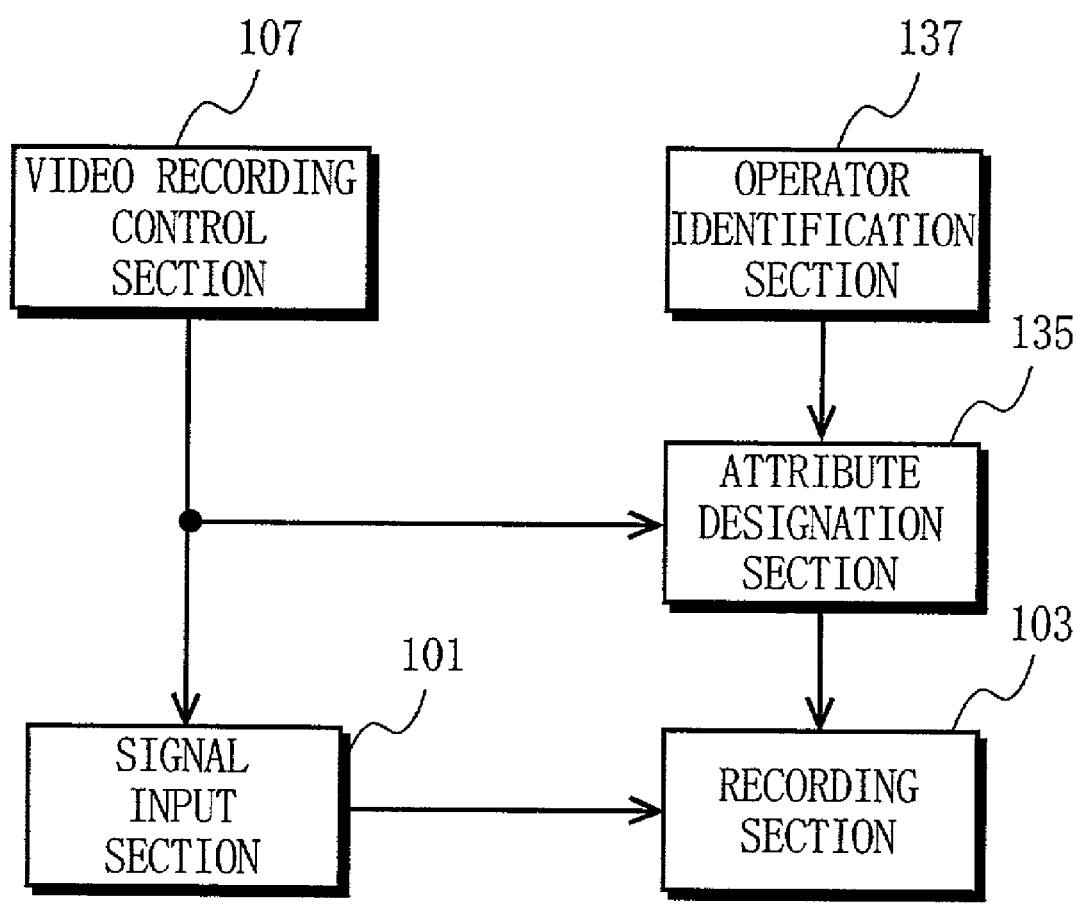

APPARATUS AND METHOD FOR VIDEO/AUDIO RECORDING

BACKGROUND OF THE INVENTION

1. Field of the Invention

The present invention relates to an apparatus and method for video/audio recording, and more particularly to an apparatus and method for video/audio recording where input data containing at least one of video data and audio data is recorded on a recording medium in a file-by-file manner.

2. Description of the Background Art

Conventionally, magnetic tape has often been used as a recording medium for recording moving pictures. Magnetic tape media are inexpensive, making it possible to store a large amount of information at a relatively low cost. However, before a user can reproduce moving picture data which is recorded on a magnetic tape medium, it is often necessary to locate the beginning of the desired moving picture data by either rewinding or fast-forwarding the tape, which can be cumbersome and time-consuming.

Accordingly, in recent years, disk media have begun to replace magnetic tape media as alternative recording media for recording moving pictures. Typical examples of such disk media are: DVDs, hard disks, MDs (mini discs), etc., on which digitized moving picture data is recorded. Such a recording medium includes a file system to enable moving picture data to be recorded in a file-by-file manner. In general, one "shot" (which corresponds to the duration from the beginning of video recording until the end of the video recording) is recorded in the form of one moving picture file.

Thus, the use of a disk medium as a recording medium allows a user to reproduce desired moving picture data by simply selecting a moving picture file. As a result, the time and trouble for locating any desired moving picture data are effectively eliminated.

However, when moving picture data is recorded on a disk medium in a file-by-file manner as described above, a large number of moving picture files may be created on the disk medium as a result of repetitious recording of moving picture data. Since such moving picture files are recorded on the medium in an unorganized manner (i.e., without being classified), it may be difficult to later find a desired moving picture file from among the many moving picture files which are recorded on the recording medium.

SUMMARY OF THE INVENTION

Therefore, an object of the present invention is to provide an apparatus and method for video/audio recording which records data (e.g., moving pictures) on a recording medium in a file-by-file manner, such that the files are automatically classified on the recording medium so as to facilitate the finding of a desired file.

The present invention has the following features to attain the above object.

A first aspect of the present invention is directed to a video/audio recording apparatus for recording input data on a recording medium in a file-by-file manner, where the input data contains at least one of video data and audio data. The video/audio recording apparatus comprises a video recording control section operable to start and stop recording of the input data; an attribute designation section operable to designate a group in which the input data is classified, where the group is determined based on a state of use of the video/audio recording apparatus; and a recording section operable to record the input data as a file on the recording medium, such that one file corresponds to the input data from when the video recording control section starts the recording and until the video recording control section stops the recording, and the file is associated with the group designated by the attribute designation section.

Thus, according to the first aspect of the present invention, input data such as moving picture data can be recorded on a recording medium while being automatically classified into groups based on the state of use of the video/audio recording apparatus, whereby a subsequent selection of a desired file can be facilitated.

According to a second aspect of the present invention, the file which is recorded by the recording section is assigned with a file name comprising a file number. Furthermore, the file number is set to an initial value if the group in which the file is classified is a different group from a group in which a last-recorded file is classified, and the file number is updated if the group in which the file is classified is the same group as the group in which the last-recorded file is classified.

Thus, according to the second aspect of the present invention, files which are classified in the same group are assigned with file numbers reflecting the chronological order in which the files are recorded. As a result, it is possible to easily select a desired file from among a number of files which are classified in the same group.

According to a third aspect of the present invention, the video/audio recording apparatus further comprises a power control section operable to turn power to the video/audio recording apparatus ON and OFF, wherein, in order to classify the file, the attribute designation section designates a different group corresponding to each of a number of periods which lapse since the power control section turns the power ON until the power control section turns the power OFF.

Thus, according to the third aspect of the present invention, any number of files which are recorded during a period between the power being turned ON and the power being turned OFF are classified in one group. Consequently, files are automatically classified based on their times of recording. As a result, the selection of any file from among a number of files recorded on the recording medium can be easily made based on their times of recording.

According to a fourth aspect of the present invention, the attribute designation section designates the group using a program number associated with the group. Furthermore, the attribute designation section updates the program number at a point between the power being turned OFF by the power control section and the recording being started by the video recording control section after the power is turned ON again.

Thus, according to the fourth aspect of the present invention, the program number is updated generally in response to the turning ON/OFF of power, so that files can be easily classified.

According to a fifth aspect of the present invention, the recording section records the file along with attribute information indicating the group designated by the attribute designation section.

Thus, according to the fifth aspect of the present invention, the file itself and attribute information indicating the group to which the file belongs are recorded on the recording medium. The attribute information facilitates the search for a desired file.

According to a sixth aspect of the present invention, the recording section records the file along with a path for the file, and the path for the file includes a directory to which the file belongs, where the directory is associated with the group designated by the attribute designation section.

Thus, according to the sixth aspect of the present invention, files are recorded in such a manner that the groups designated by the attribute information have a one-to-one correspondence with directories. Thus, the present invention can be easily adapted to any common directory-based system.

According to a seventh aspect of the present invention, the video/audio recording apparatus further comprises a group change section operable to allow the group designated by the attribute designation section to be changed.

Thus, according to the seventh aspect of the present invention, a user can freely designate a group in which to classify a file. As a result, the files can be classified in a flexible manner as desired by the user.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram illustrating the structure of a video/audio recording apparatus according to a first embodiment of the present invention;

FIG. 5 is a table illustrating a conversion algorithm used by a recording section 111 according to the second embodiment of the present invention;

FIG. 13 is a block diagram illustrating the structure of a video/audio recording apparatus according to a ninth embodiment of the present invention.

DETAILED DESCRIPTION OF THE PREFERRED EMBODIMENTS

First Embodiment of the Present Invention

Figure 2:
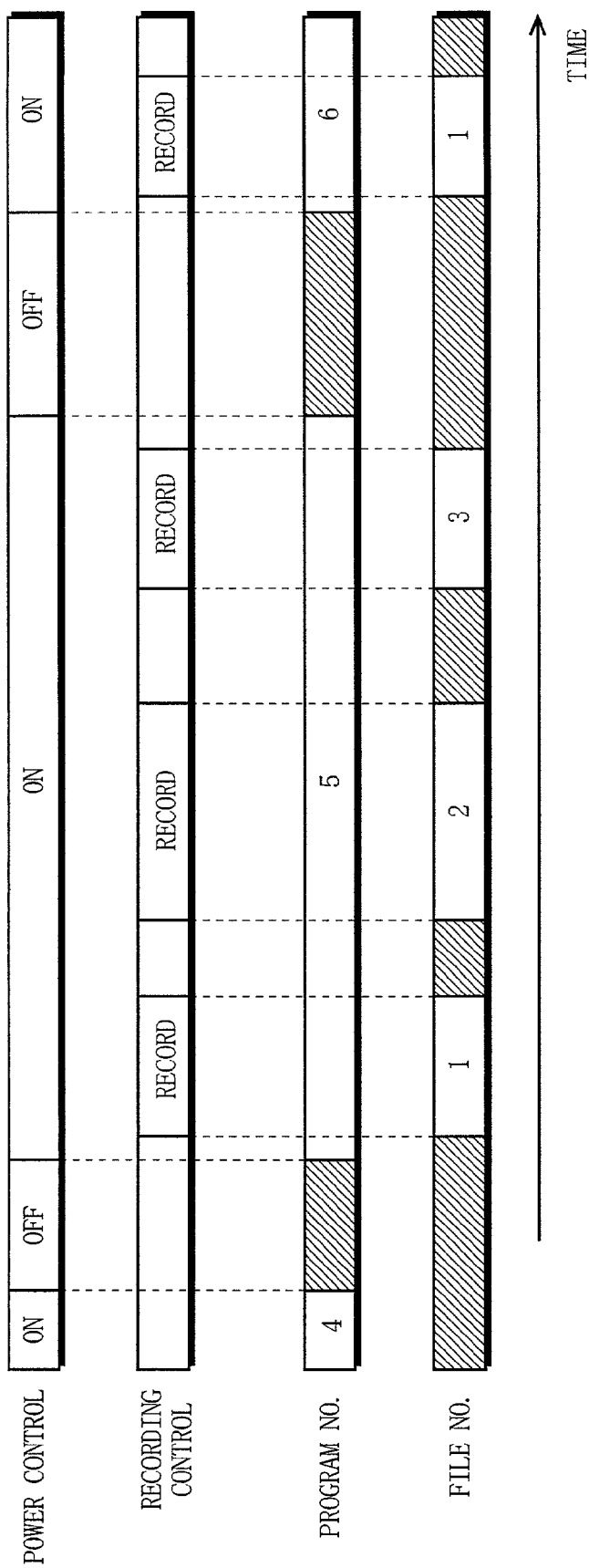
FIG. 2 is a diagram showing a relationship between power control statuses, video recording control statuses, a program number, and a file number according to the first embodiment of the present invention.

FIG. 1 is a block diagram illustrating the structure of a video/audio recording apparatus according to a first embodiment of the present invention. The video/audio recording apparatus includes a signal input section 101, a recording section 103, a power control section 105, a video recording control section 107, and an attribute designation section 109. An operation according to the present embodiment will be described below.

The power control section 105, which turns the power of the video/audio recording apparatus ON or OFF, outputs power control information. The video recording control section 107, which starts or stops video recording, outputs video recording control information. The power control information and the video recording control information are supplied to both the signal input section 101 and the attribute designation section 109. Based on the received power control information and video recording control information, the signal input section 101 performs the following operation: the signal input section 101 begins inputting moving picture data (which may be generated through actual "shooting", for example) to the recording section 103 when recording is started while the power is ON; and the signal input section 101 stops inputting the moving picture data to the recording section 103 when the power is turned OFF or recording is stopped. Based on the received power control information and video recording control information, the attribute designation section 109 generates attribute information to be used for classifying moving picture files (described below), and then supplies the generated attribute information to the recording section 103. The recording section 103 records the moving picture data which has been input via the signal input section 101 as "moving picture files" on a recording medium (e.g., a disk medium) such that the moving picture files are classified based on the attribute information which is received from the attribute designation section 109.

Hereinafter, the operation of the video/audio recording apparatus will be described in more detail. A user may operate the power control section 105 to turn the video/audio recording apparatus ON. Power control information indicating that the power has been turned ON is passed to the signal input section 101 and the attribute designation section 109. In response to the received power control information, the attribute designation section 109 increments a program number (described below) and sets a file number (described below) to an initial value. According to the first embodiment of the invention, any moving picture data which is inputted during one recording process, i.e., after recording is started and until the recording is stopped, is recorded as one moving picture "file". Any number of moving picture files which are recorded through a number of recording processes after the power is turned ON and before the power is turned OFF are designated to be part of one "program". For the sake of illustration, it is herein assumed that the incremented program number is "5" and that the file number receives an initial value of "1". The program number and the file number which have been thus designated by the attribute designation section 109 are passed to the recording section 103 as attribute information.

When the user begins recording upon operating the video recording control section 107, video recording control information indicating that recording has been begun is passed to the signal input section 101 and the attribute designation section 109, thereby causing the signal input section 101 to begin inputting the moving picture data. The moving picture data is recorded by the recording section 103 as a moving picture file on the recording medium. In addition to the moving picture file, the recording section 103 also records on the recording medium the program number "5" and the file number "1" (contained in the aforementioned attribute information) as the attribute information for that moving picture file. When the recording is stopped by the video recording control section 107, the recording section 103 quits its recording process. At this point, the attribute designation section 109 may increment the file number to be ready for a next recording process.

When the video recording control section 105 resumes recording, the program number and the file number contained in the attribute information which is outputted from the attribute designation section 109 will be "5" and "2", respectively. Accordingly, the recording section 103 records on the recording medium a moving picture file along with the program number "5" and the file number "2", which serve as the attribute information for that moving picture file. When the recording is later stopped by the video recording control section 107, the recording section 103 quits its recording process, and the attribute designation section 109 increments the file number. Thus, the file number will be incremented for each new recording process.

Next, an exemplary operation will be described in which, after several recording processes have occurred in the aforementioned manner, the power control section 105 turns the power OFF and then back ON. In this case, the attribute designation section 109 increments the program number, and sets the file number to the initial value, so that the program number will be "6", and the file number "1". Thus, when the video recording control section 107 begins recording, the recording section 3 records on the recording medium a moving picture file along with the program number "6" and the file number "1", which serve as the attribute information for that moving picture file. Thereafter, the file number will be incremented for each new recording process, as described above.

FIG. 2 is a diagram showing a relationship between power control statuses, video recording control statuses, a program number, and a file number according to the first embodiment of the present invention. As shown in FIG. 2, all of the moving picture files which are recorded after the power is turned ON and before the power is turned OFF will be recorded on the recording medium with the same program number.

Figure 3:
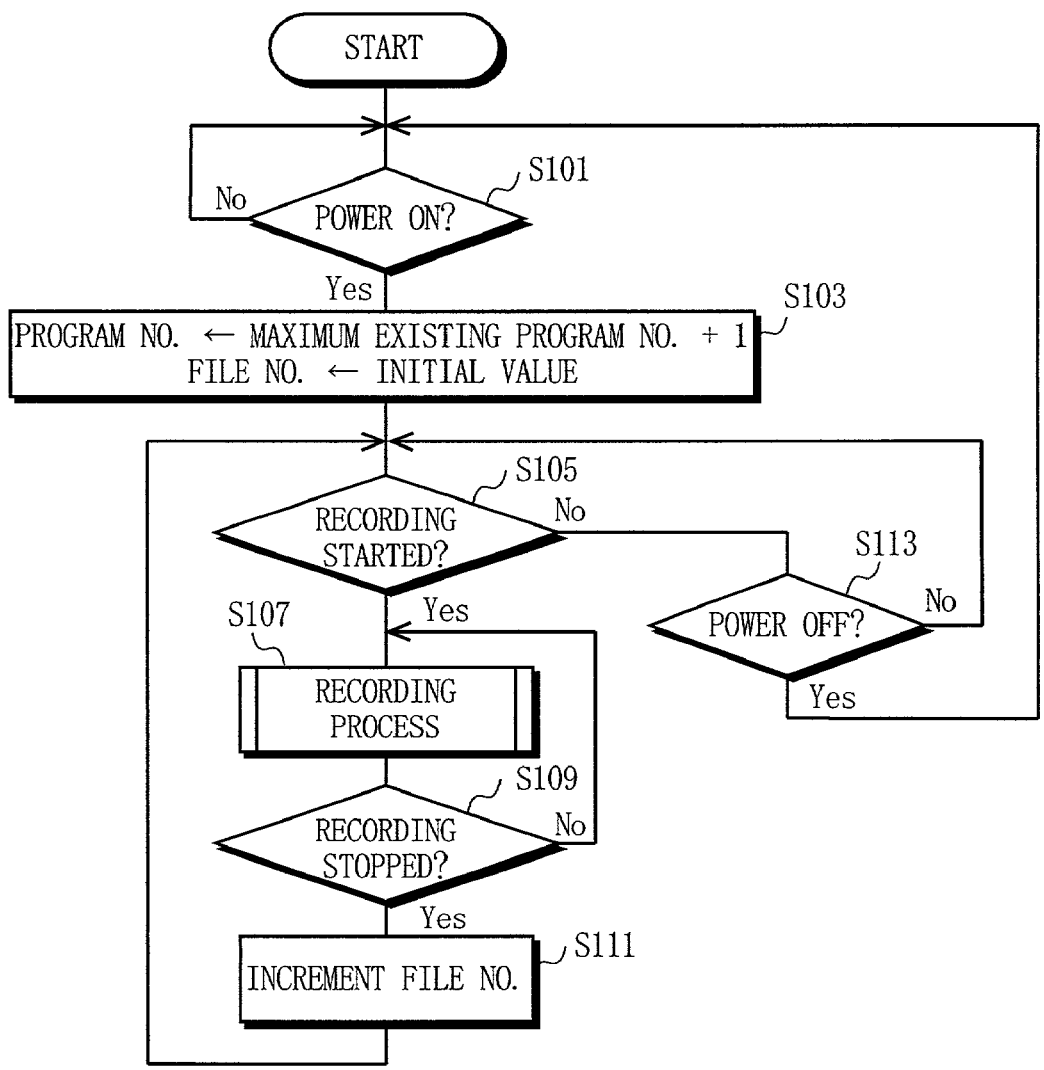
FIG. 3 is a flowchart illustrating an operation according to the first embodiment of the present invention.

Next, the operation of the video/audio recording apparatus according to the first embodiment of the invention, in particular that of the attribute designation section 109, will be described with reference to a flowchart shown in FIG. 3. Once the operation is begun, the attribute designation section 109 determines at step S101 whether or not the power has been turned ON based on the power control information provided from the power control section 105. If it is determined that the power has been turned ON, the control proceeds to step S103; if the power is OFF, step S101 will be repeated until the power is turned ON. At step S103, a program number and a file number are set. The program number may basically be set at a value which is greater by one than a program number which existed the last time the power was ON. However, if for some reason the recording medium has been replaced with another recording medium while the power was OFF, a program number which is prescribed in this manner may run the risk of being identical to a program number of some data which is already recorded on the recording medium. In order to avoid this problem, it is preferable to acquire the greatest program number that is currently recorded on the recording medium, and set a value which is obtained by adding one to this acquired number as a new program number. On the other hand, the file number is set to a predetermined initial value (e.g., "1"). After setting the program number and the file number, the control proceeds to step S105.

At step S105, the attribute designation section 109 determines whether or not recording has been started based on the video recording control information provided from the video recording control section 107. If it is determined that recording has been started, the control proceeds to step S107; if not, the control proceeds to step S113. At step S107, the program number and the file number are passed to the recording section 103 as attribute information, and the recording section 103 records incoming moving picture data as a moving picture file on the recording medium, on the basis of this attribute information. At step S109, the attribute designation section 109 determines whether or not the recording has been stopped based on the video recording control information provided from the video recording control section 107. If it is determined that the recording has been stopped, the control proceeds to step S111; if not, the control returns to step S107. At step S111, the file number is incremented to be ready for a next recording process, and the control returns to step S105.

On the other hand, if it is determined that recording has not been started at step S105, then it is determined at step S113 whether or not the power has been turned OFF based on the power control information provided from the power control section 105. If it is determined that power has been turned OFF, the control returns to step S101; if not, the control returns to step S105.

Although the signal which is inputted via the signal input section 101 is illustrated as moving picture data in the present embodiment, there is no limitation as to the type of incoming signal. For example, the signal which is inputted via the signal input section 101 may contain at least one of video data and audio data. Moreover, the signal which is inputted via the signal input section 101 may contain moving picture data which is generated through actual shooting, broadcast data which is received by means of a tuner or the like, data which is externally supplied via an external input terminal or the like, or any other data.

Although the first embodiment illustrates a case where the operation of the signal input section 101 is controlled based on the video recording control information provided from the video recording control section 107, the present invention is not limited thereto. For example, the video recording control information provided from the video recording control section 107 may be used to control the operation of the recording section 103. Specifically, the signal input section 101 may continuously supply the incoming moving picture data to the recording section 103 whenever the power is ON, and the recording section 103 may be controlled so as to perform recording only when a start of recording is instructed.

Thus, in accordance with the first embodiment of the present invention, any number of moving picture files which are recorded after the power is turned ON and before the power is turned OFF the next time are designated to be part of one program. As a result, moving picture files are automatically classified in accordance with their times of recording (i.e., when they were recorded). Accordingly, the selection of any moving picture files from among a number of moving picture files recorded on a recording medium can be easily made based on their times of recording. In addition, since moving picture files bearing the same program number are denoted by file numbers which represent the chronological order in which they were recorded, a desired moving picture file can be easily selected from among moving picture files which were produced substantially "at the same time of recording" (i.e., not exactly the same time but close enough to bear the same program number).

Second Embodiment of the Present Invention

Figure 4:
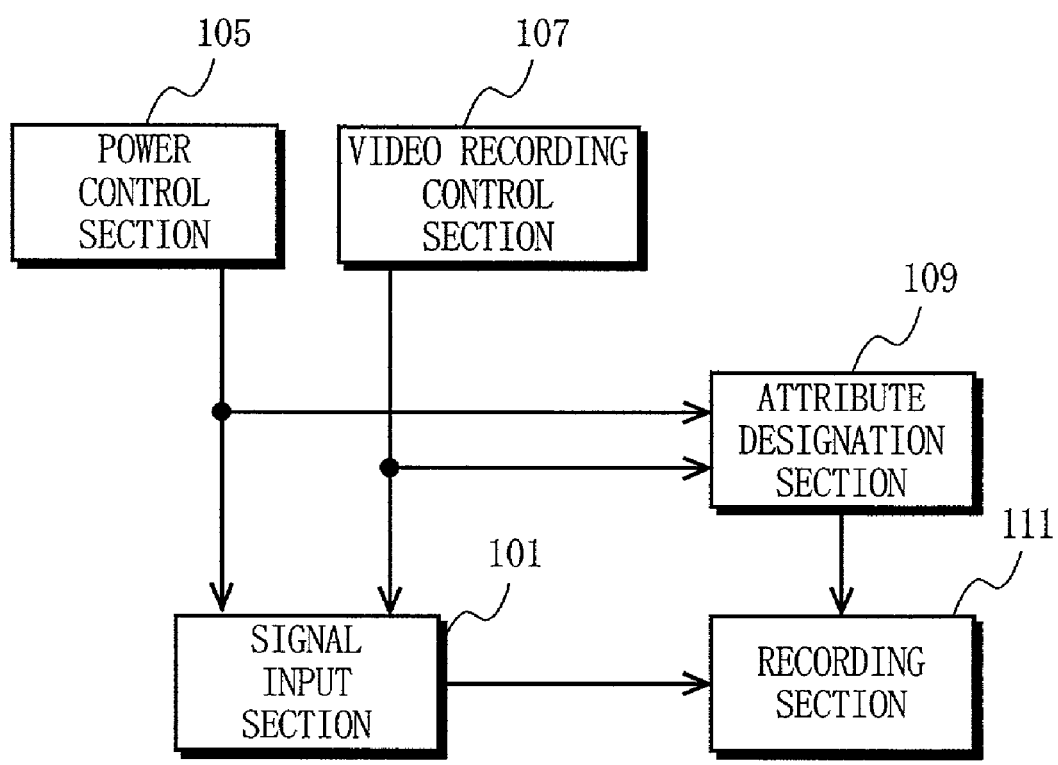
FIG. 4 is a block diagram illustrating the structure of a video/audio recording apparatus according to a second embodiment of the present invention.

FIG. 4 is a block diagram illustrating the structure of a video/audio recording apparatus according to a second embodiment of the present invention. As shown in FIG. 4, the video/audio recording apparatus includes a signal input section 101, a recording section 111, a power control section 105, a video recording control section 107, and an attribute designation section 109. The second embodiment is identical to the first embodiment except for the operation of the recording section III. In FIG. 4, any component elements which are identical to those shown in FIG. 1 are denoted by the same reference numerals as those used therein, and the descriptions thereof are omitted. Hereinafter, the operation of the recording section 111 will be described.

The recording section 111 converts the program number and the file number contained in the attribute information (which is provided from the attribute designation section 109) into a path name and a file name, respectively, for a moving picture file to be recorded. FIG. 5 shows an example conversion algorithm thereof. As shown in FIG. 5, the program number is inserted at the "xxx" portion of a directory name "PRGxxx", and the file number is inserted at the "yyy" portion of a file name "MOVyyy.MOD". As a result, a moving picture file whose program number is "1" and whose file number is "2" will have path/file name of "C:¥PRG001¥MOV002.MOD".

Thus, in accordance with the second embodiment of the present invention, a path and a file name of a moving picture file to be recorded are determined based on the program number and the file number contained in the attribute information. As a result, any number of moving picture files which are recorded after the power is turned ON and before the power is turned OFF are stored in one directory. Thus, the moving picture files are automatically stored in directories which are designated in accordance with the times at which these moving picture files are recorded. Accordingly, the selection of any moving picture files from among a number of moving picture files recorded on a recording medium can be easily made by searching in directories associated with their times of recording. In addition, since moving picture files which are stored in the same directory are denoted by file numbers which represent the chronological order in which they were recorded, a desired moving picture file can be easily selected from among the moving picture files in the directory.

Third Embodiment of the Present Invention

Figure 6:
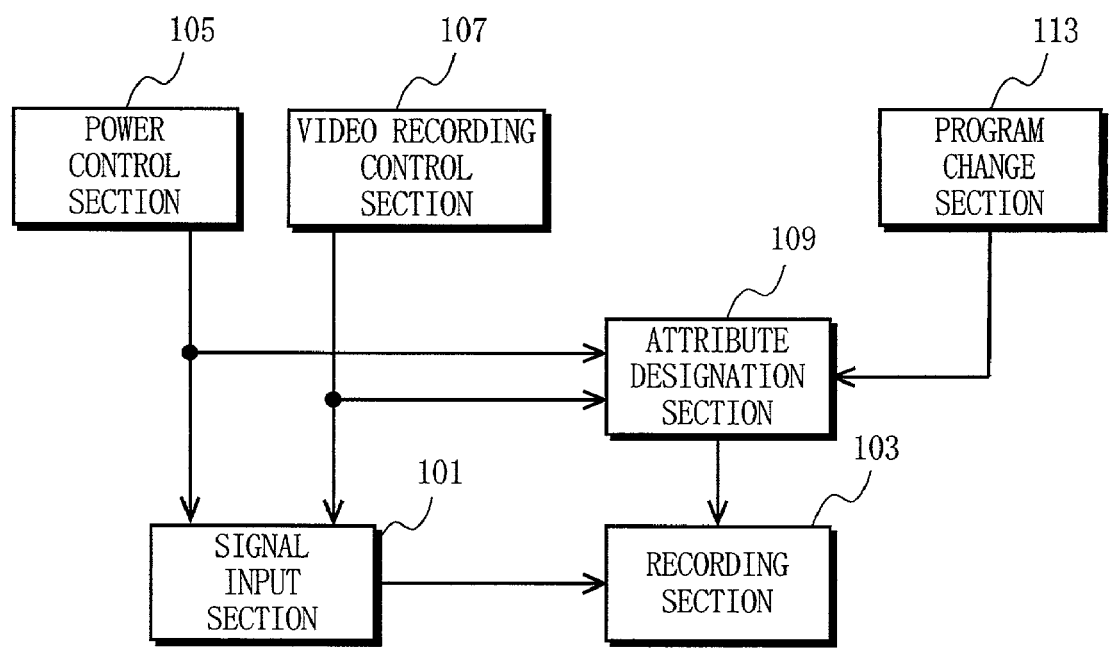
FIG. 6 is a block diagram illustrating the structure of a video/audio recording apparatus according to a third embodiment of the present invention.

FIG. 6 is a block diagram illustrating the structure of a video/audio recording apparatus according to a third embodiment of the present invention. The video/audio recording apparatus includes a signal input section 101, a recording section 103, a power control section 105, a video recording control section 107, an attribute designation section 109, and a program change section 113. The third embodiment is identical to the first embodiment except for the addition of the program change section 113. In FIG. 6, any component elements which are identical to those shown in FIG. 1 are denoted by the same reference numerals as those used therein, and the descriptions thereof are omitted. Hereinafter, the operation of the program change section 113 will be mainly described.

The program change section 113 outputs program change information used for changing program numbers to the attribute designation section 109. Based on the program change information, the attribute designation section 109 changes the program number of a given moving picture file. The program change section 113 allows a user to arbitrarily change the program number under which a given moving picture file is to be classified. While the first embodiment of the present invention does not permit the program number to be changed without turning the power OFF, the third embodiment of the present invention allows a user to arbitrarily change the program number by operating the program change section 113, without having to turn the power OFF.

An exemplary implementation of the program change section 113 may be a simple button, where the attribute designation section 109 increments the program number in response to a user depressing the button. In this case, after the power is turned ON and some moving picture files are recorded, if the user wishes to designate any new moving picture files to be recorded into a different program from that which the already-recorded moving picture files belong to, the user only needs to depress the button to classify the newly-recorded moving picture files in a new program.

As another implementation of the program change section 113, a list of programs which are already recorded on the recording medium may be presented to a user, who is then allowed to select one of the listed programs. In this case, in response to the user selecting one of the listed programs, the attribute designation section 109 sets the program number to a program number associated with the program which has been selected by the user. As a result, any new moving picture files to be recorded will be added to the program which has been selected by the user.

Thus, in accordance with the third embodiment of the present invention, not only can a moving picture file be automatically classified in response to the turning ON/OFF of power, but the user can also arbitrarily change the program in which to classify a moving picture file. Therefore, desired moving picture files can be recorded with a manner of classification which provides more ease of selection for the user.

Thus, the first through third embodiments of the present invention have been described above. Although the first embodiment illustrates a case where moving picture files are classified according to the turning ON/OFF of power, the present invention permits a number of other variants. Some of such variants will be described below.

Fourth Embodiment of the Present Invention

Figure 7:
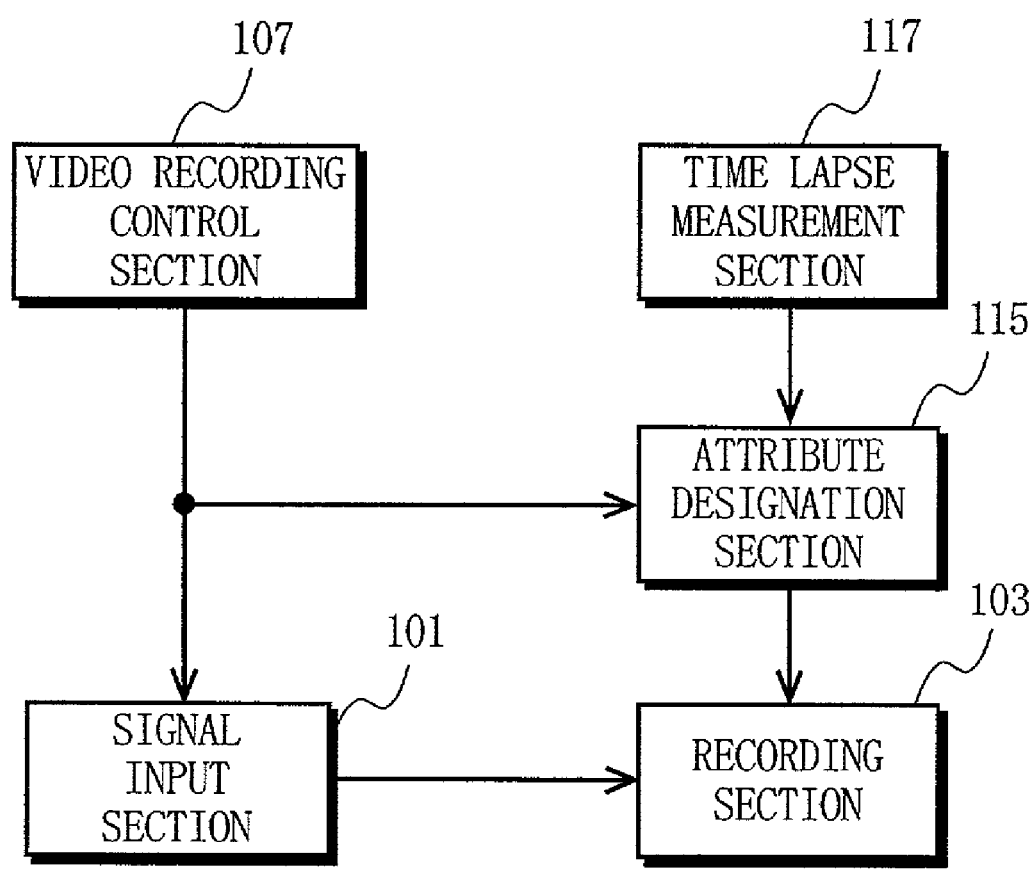
FIG. 7 is a block diagram illustrating the structure of a video/audio recording apparatus according to a fourth embodiment of the present invention.

FIG. 7 is a block diagram illustrating the structure of a video/audio recording apparatus according to a fourth embodiment of the present invention, which provides a variant of the first embodiment. The video/audio recording apparatus includes a signal input section 101, a recording section 103, a video recording control section 107, an attribute designation section 115, and a time lapse measurement section 117. In FIG. 7, any component elements which are identical to those shown in FIG. 1 are denoted by the same reference numerals as those used therein, and the descriptions thereof are omitted.

The time lapse measurement section 117 measures a lapse of time from the point at which a recording process was first performed for the currently recorded program, and informs the attribute designation section 115 of that amount of time. If the informed lapse of time exceeds a predetermined value, the attribute designation section 115 updates (e.g., increments by one) the program number of a program in which a moving picture file to be recorded next will be classified.

Thus, according to the fourth embodiment of the present invention, moving picture files which are recorded within a predetermined period of time are classified into one program. As a result, any moving picture files which are recorded beyond the predetermined period of time can be automatically classified in another program to be recorded.

Fifth Embodiment of the Present Invention

Figure 8:
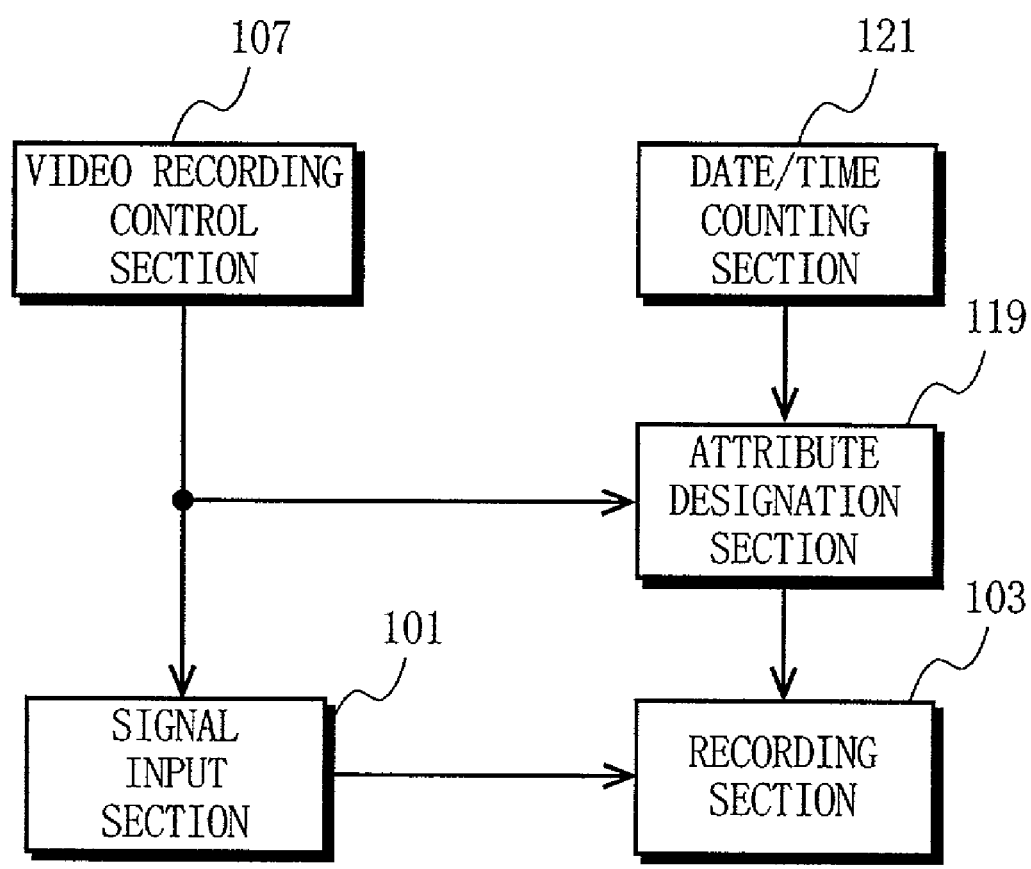
FIG. 8 is a block diagram illustrating the structure of a video/audio recording apparatus according to a fifth embodiment of the present invention.

FIG. 8 is a block diagram illustrating the structure of a video/audio recording apparatus according to a fifth embodiment of the present invention, which provides a variant of the first embodiment. The video/audio recording apparatus includes a signal input section 101, a recording section 103, a video recording control section 107, an attribute designation section 119, and a date/time counting section 121. In FIG. 8, any component elements which are identical to those shown in FIG. 1 are denoted by the same reference numerals as those used therein, and the descriptions thereof are omitted.

The date/time counting section 121 informs the attribute designation section 119 of the current date and time. The attribute designation section 119 converts the informed date and time to a program number. For example, if the informed date and time indicates "14:50" on the tenth day of the month, the program number may be set to "14" based on the hour information.

Figure 9:
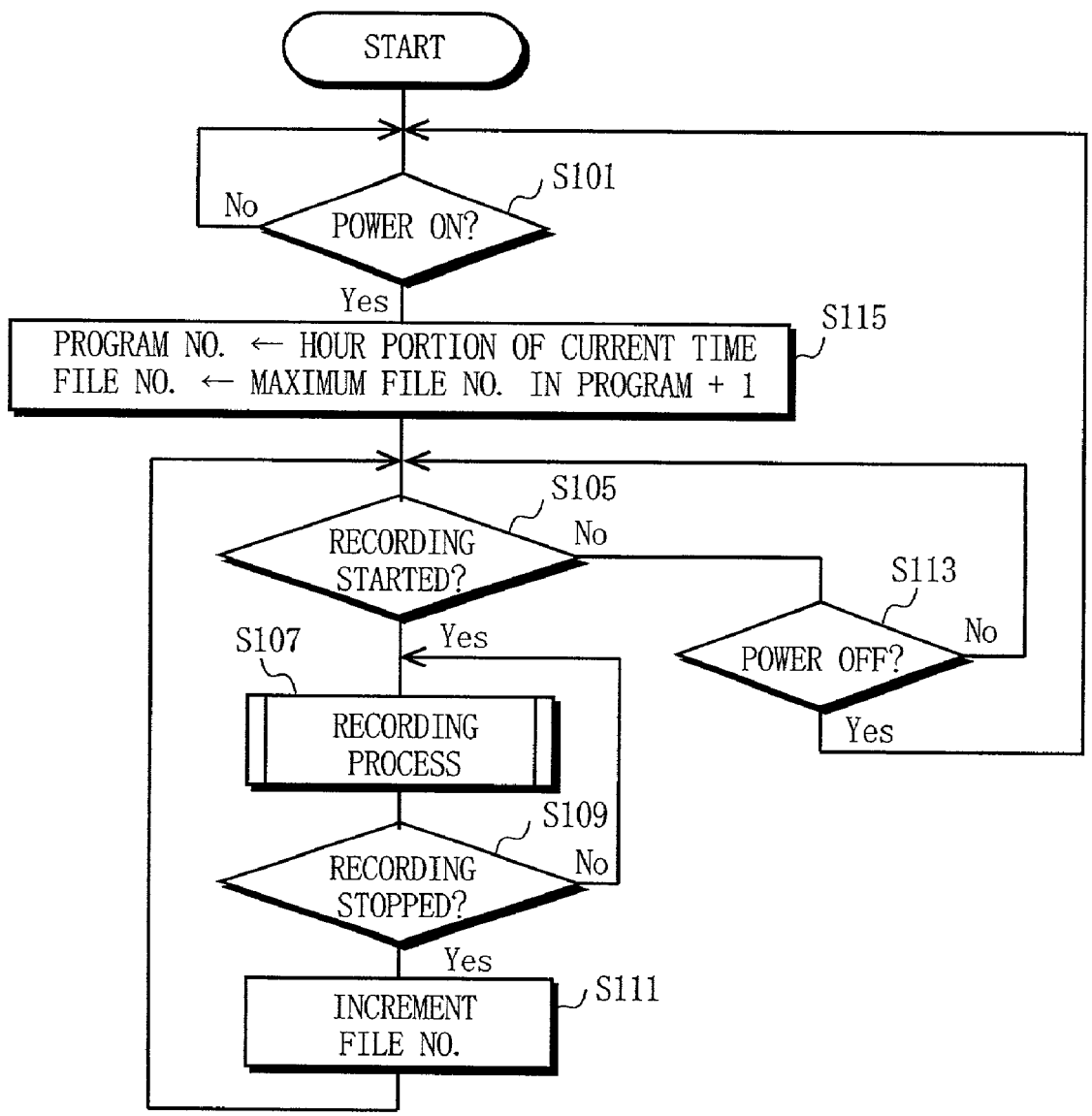
FIG. 9 is a flowchart illustrating an operation according to the fifth embodiment of the present invention.

However, in the case where moving picture files are classified in accordance with the hours at which the files are recorded, there is a problem in that two files which are recorded at the same hour on different dates will be given the same file name, and the first file may be overwritten by the second file. Accordingly, in order to avoid this problem in such cases, the fifth embodiment of the present invention employs the flowchart shown in FIG. 9. As shown in step S115, the greatest file number among the file numbers already recorded in the program in which a moving picture file of interest is to be classified may be acquired, and a value which is obtained by adding one to this acquired number can be set as a new file number for that file. If no files have been recorded in the program in which a moving picture file of interest is to be classified, "1" is set as a file number. In FIG. 9, steps other than S115 are identical to those in the flowchart of FIG. 3, and therefore are denoted by the same reference numerals as those used therein, with the descriptions there of being omitted.

Thus, according to the fifth embodiment of the present invention, moving picture files which are recorded at the same date/time are classified in one program. As a result, moving picture files can be automatically classified in accordance with the times at which they are recorded.

Sixth Embodiment of the Present Invention

Figure 10:
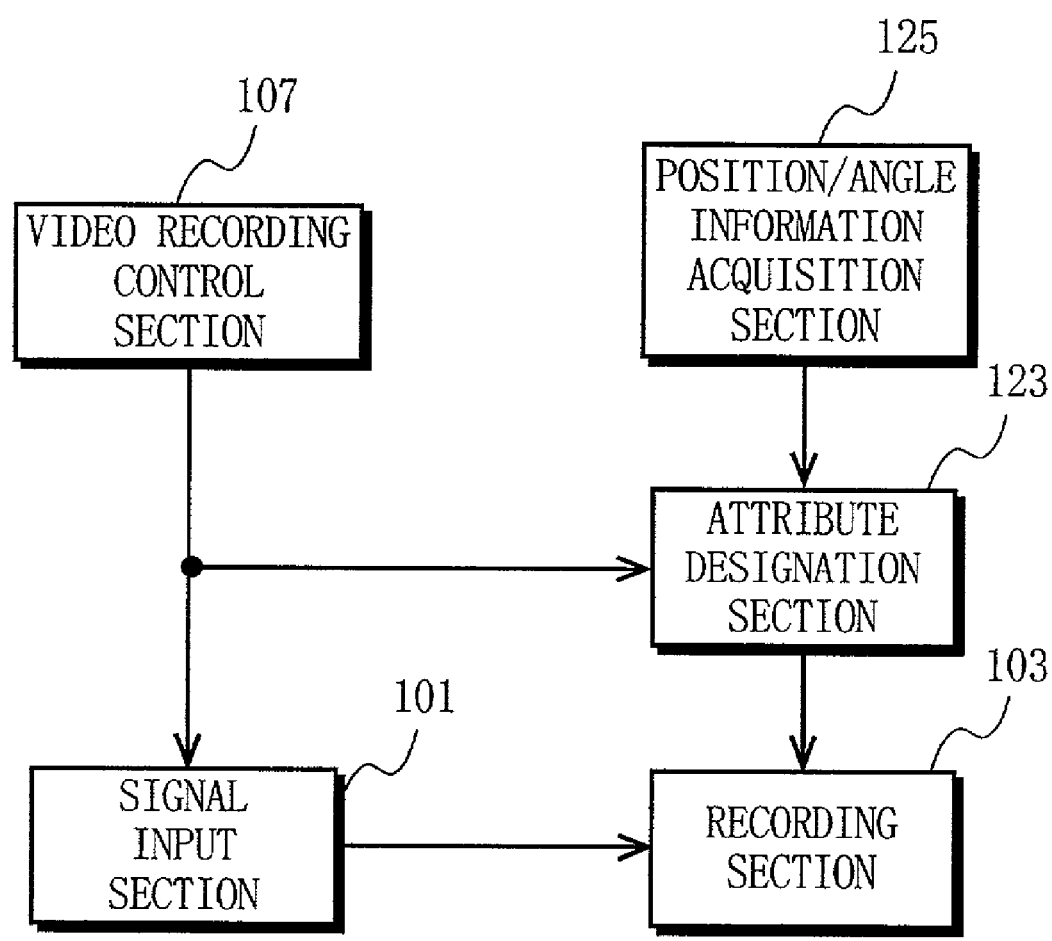
FIG. 10 is a block diagram illustrating the structure of a video/audio recording apparatus according to a sixth embodiment of the present invention.

FIG. 10 is a block diagram illustrating the structure of a video/audio recording apparatus according to a sixth embodiment of the present invention, which provides a variant of the first embodiment. The video/audio recording apparatus includes a signal input section 101, a recording section 103, a video recording control section 107, an attribute designation section 123, and a position/angle information acquisition section 125. In FIG. 10, any component elements which are identical to those shown in FIG. 1 are denoted by the same reference numerals as those used therein, and the descriptions thereof are omitted.

The position/angle information acquisition section 125 measures the position and/or angle of the video/audio recording apparatus by means of a GPS (global positioning system) or a gyroscope, etc., and informs the attribute designation section 123 of the measured position and/or angle. The attribute designation section 123 converts the informed position and/or angle to a program number. Note that the converted program numbers do not need to correspond one-to-one to the informed position and/or angle value(s). For example, the program number may be set to "1" if shooting is being conducted with a positive angle of elevation, and set to "2" if shooting is being conducted with a depression angle, so that a predetermined range of positions and/or angles is associated with one program number.

Thus, according to the sixth embodiment of the present invention, moving picture files are classified in association with the position and/or angle of the video/audio recording apparatus. A position-based classification would enable automatic classification of moving picture files based on where the user may be traveling, for example. An angle-based classification would enable automatic classification of moving picture files based on objects to be filmed, as in the case of a camera which is always deployed in a fixed position, etc.

Seventh Embodiment of the Present Invention

Figure 11:
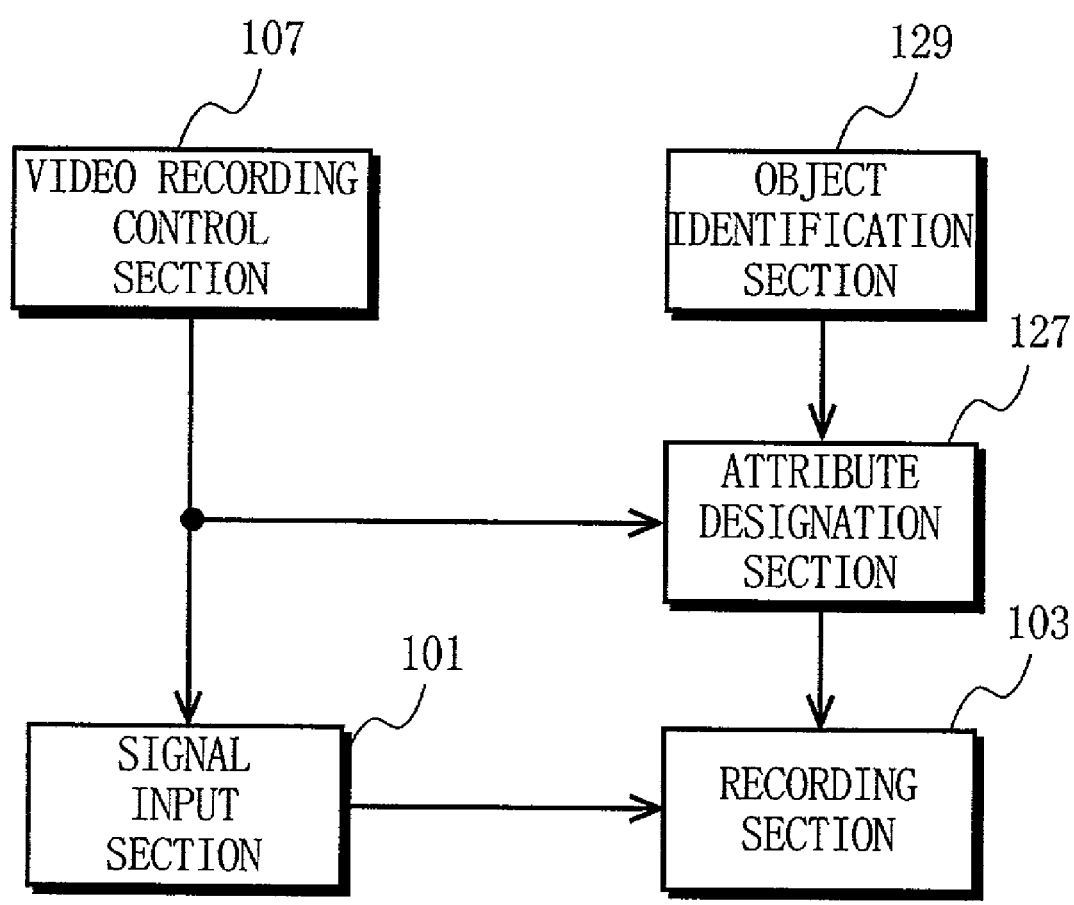
FIG. 11 is a block diagram illustrating the structure of a video/audio recording apparatus according to a seventh embodiment of the present invention.

FIG. 11 is a block diagram illustrating the structure of a video/audio recording apparatus according to a seventh embodiment of the present invention, which provides a variant of the first embodiment. The video/audio recording apparatus includes a signal input section 101, a recording section 103, a video recording control section 107, an attribute designation section 127, and an object identification section 129. In FIG. 11, any component elements which are identical to those shown in FIG. 1 are denoted by the same reference numerals as those used therein, and the descriptions thereof are omitted.

The object identification section 129 utilizes image recognition techniques or the like to identify an object to be filmed, and informs the attribute designation section 127 of the results of identification. Based on the informed identification results, the attribute designation section 127 selects a program associated with each object. Thus, according to the seventh embodiment, it is possible to automatically classify moving picture files in association with different objects.

Eighth Embodiment of the Present Invention

Figure 12:
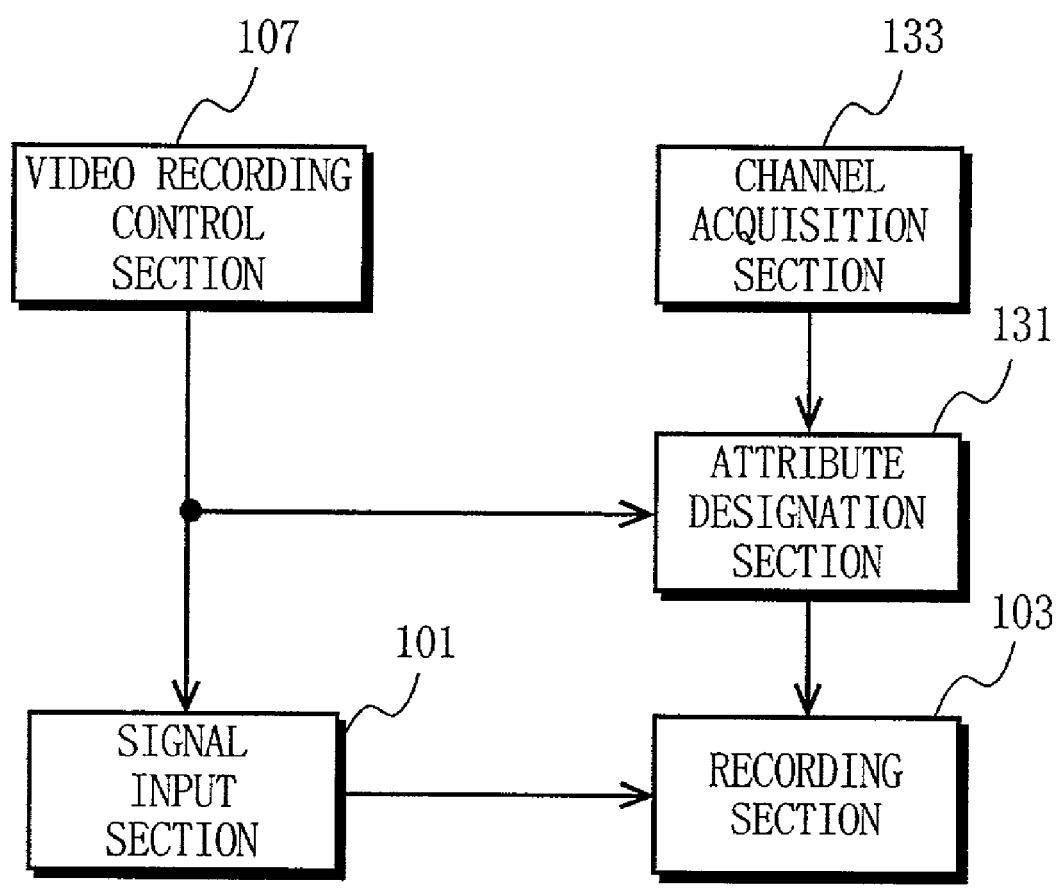
FIG. 12 is a block diagram illustrating the structure of a video/audio recording apparatus according to an eighth embodiment of the present invention.

FIG. 12 is a block diagram illustrating the structure of a video/audio recording apparatus according to an eighth embodiment of the present invention, which provides a variant of the first embodiment. The video/audio recording apparatus includes a signal input section 101, a recording section 103, a video recording control section 107, an attribute designation section 131, and a channel acquisition section 133. In FIG. 12, any component elements which are identical to those shown in FIG. 1 are denoted by the same reference numerals as those used therein, and the descriptions thereof are omitted.

The channel acquisition section 133 acquires channel information concerning a signal which is input via the signal input section 101, and informs the attribute designation section 131 of the acquired channel information. Based on the informed channel information, the attribute designation section 131 either designates the received channel number as a program number, or converts the received channel number into a number which is designated a program number. Thus, according to the eighth embodiment, it is possible to automatically classify moving picture files in association with different received channels.

Ninth Embodiment of the Present Invention

FIG. 13 is a block diagram illustrating the structure of a video/audio recording apparatus according to a ninth embodiment of the present invention, which provides a variant of the first embodiment. The video/audio recording apparatus includes a signal input section 101, a recording section 103, a video recording control section 107, an attribute designation section 135, and an operator identification section 137. In FIG. 13, any component elements which are identical to those shown in FIG. 1 are denoted by the same reference numerals as those used therein, and the descriptions thereof are omitted.

The operator identification section 137 identifies an operator based on a fingerprint (as detected at operation buttons), a palm print (as detected at a gripping portion of the apparatus), speech recognition based on the operator's voice, iris recognition (as detected at a finder) or the like, and informs the attribute designation section 135 of the results of identification. Based on the informed results of identification, the attribute designation section 135 designates a program number which is previously associated with the identified operator. Thus, according to the ninth embodiment of the present invention, it is possible to automatically classify moving picture files in association with different operators.

As described above, according to the present invention, moving picture files can be automatically classified based on various information concerning the "state of use" of the video/audio recording apparatus, i.e., how the video/audio recording apparatus is being used.

Although the above-described embodiments are directed to the case of recording moving picture data, the present invention is not limited thereto. For example, similar effects can also be obtained in connection with audio data recording, as will be appreciated.

Although program numbers and file numbers are illustrated as components of the attribute information, the present invention is not limited thereto. For example, programs may be specified by using any arbitrarily-selected character strings, instead of program numbers.

While the invention has been described in detail, the foregoing description is in all aspects illustrative and not restrictive. It is understood that numerous other modifications and variations can be devised without departing from the scope of the invention.

What is claimed is:

1. A recording apparatus comprising:
 a power source switch operable to turn a power source of said recording apparatus ON and OFF;
 an input section operable to input data containing at least one of video data and audio data;
 an attribute designation section operable to generate attribute information which is required when the input data is recorded on a recording medium; and
 a recording section operable to record the input data on the recording medium in a file-by-file manner based on the attribute information generated by said attribute designation section, wherein:
 said attribute designation section is operable to generate the attribute information, such that the input data inputted from said input section, in a first ON time period from a time at which said power source switch turns the power source ON to a time at which said power source switch turns the power source OFF, is classified into a group, and the input data inputted from said input section, in a second ON time period subsequent to the first ON time period, is classified into another group;
 when the input data inputted from said input section, in the second ON time period, is classified into the other group, said recording section is operable to assign a predetermined file name, which is not associated with a file name assigned to the input data inputted in the first ON time period, to the input data to be classified into the other group; and
 the predetermined file name includes an identification number for identifying the input data classified in a same group, and the identification number includes the lowest number among a group of identification numbers which can be assigned in the same group.

2. A recording method performed by a recording apparatus which comprises a power source switch for turning a power source of the recording apparatus ON and OFF, an input section for inputting data containing at least one of video data and audio data, an attribute designation section for generating attribute information which is required when the input data is recorded on a recording medium, and a recording section for recording the input data on the recording medium in a file-by-file manner based on the generated attribute information, said recording method comprising:
 generating the attribute information, such that the input data inputted from the input section, in a first ON time period from a time at which the power source is turned ON to a time at which the power source is turned OFF, is classified into a group, and the input data inputted from the input section, in a second ON time period subsequent to the first ON time period, is classified into another group; and
 causing the recording section to assign, when the input data inputted in the second ON time period subsequent to the first ON time period is classified into the other group, a predetermined file name, which is not associated with a file name assigned to the input data inputted in the first ON time period, to the input data to be classified into the other group,
 wherein the predetermined file name includes an identification number for identifying the input data classified in a same group, and the identification number includes the lowest number among a group of identification numbers which can be assigned in the same group.

* * * * *